April 14, 1931.  H. SCHLAICH  1,801,210
PROCESS AND APPARATUS FOR FILLING THERMOMETERS
Filed June 11, 1925   2 Sheets-Sheet 1
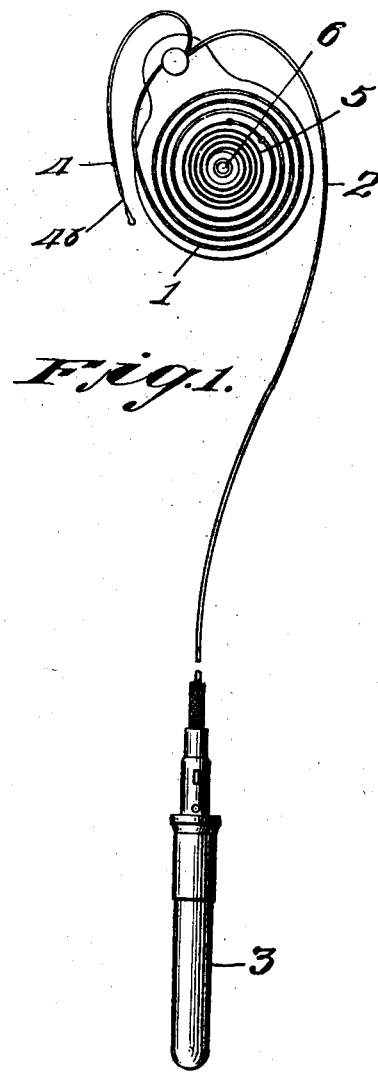
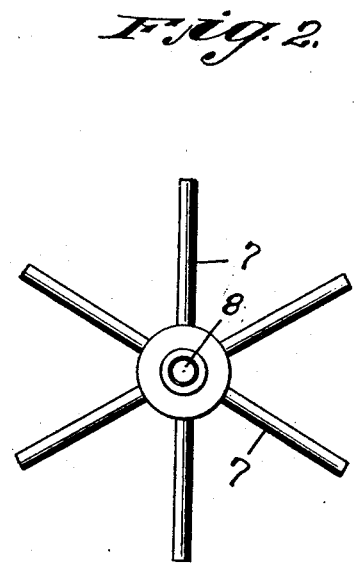
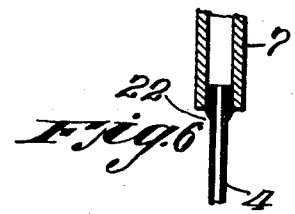
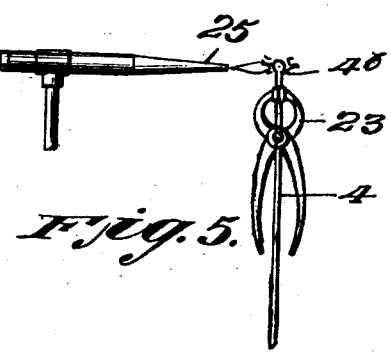
INVENTOR
Herman Schlaich,
BY
Moore + Nolte
ATTORNEYS April 14, 1931.  H. SCHLAICH  1,801,210
PROCESS AND APPARATUS FOR FILLING THERMOMETERS
Filed June 11, 1925  2 Sheets-Sheet 2
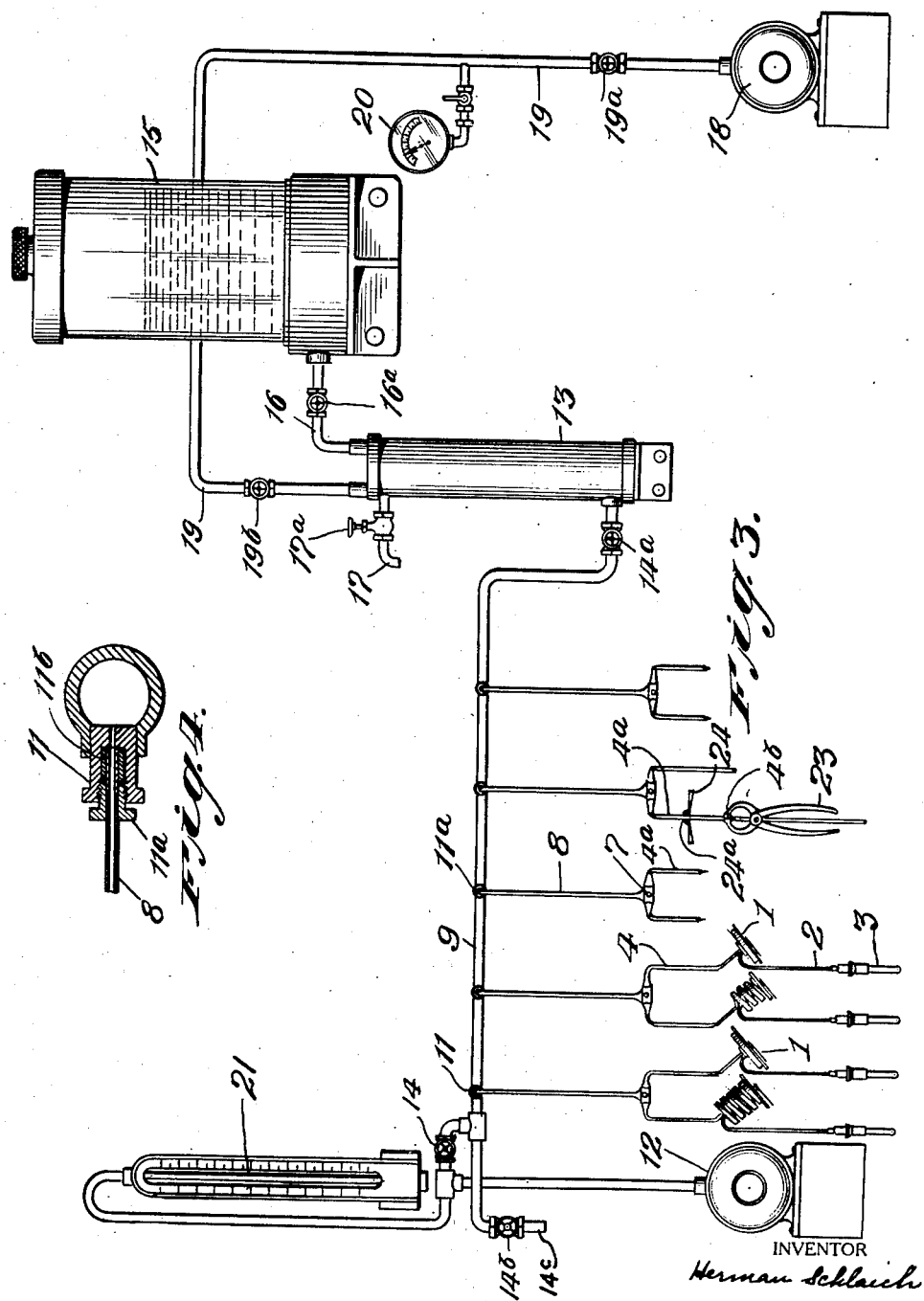

Patented Apr. 14, 1931

1,801,210

UNITED STATES PATENT OFFICE

HERMAN SCHLAICH, OF LONG ISLAND CITY, NEW YORK

PROCESS AND APPARATUS FOR FILLING THERMOMETERS

Application filed June 11, 1925. Serial No. 36,560.

This invention relates to a process and apparatus for filling thermometers or similar instruments with a temperature responsive fluid.

It is an object of the invention to provide an apparatus and process whereby the bulb and tubular portions of thermometers may be quickly and efficiently exhausted of air, then completely filled with temperature responsive fluid, and sealed.

To this end provision may be made of apparatus for exhausting and filling a large number of thermometers simultaneously. Such apparatus may include a line or system to which a large number of thermometers may be attached, and means for first exhausting the line of air to evacuate the line and all of the attached thermometers, and for then forcing temperature responsive liquid into the line under pressure to fill all of the attached thermometers.

Other objects and advantages will hereinafter appear.

Referring now to the drawings which illustrate a preferred method and apparatus for practicing the invention:—

Figure 1 is an elevation of one form of thermometer mechanism which the apparatus and process is particularly adapted to fill.

Figure 2 is a plan view partially in section of one means for attaching the thermometer to the filling apparatus.

Figure 3 is a diagrammatic layout of the filling apparatus.

Figure 4 is a detail view through one of the manifold nipples.

Figure 5 is a detail view illustrating the final step of the filling process.

Figure 6 is a sectional view of the filling tube as secured in the attaching means.

The operation of the invention will be described in connection with the form of thermometer mechanism shown in Figure 1, but it will be obvious as the description proceeds that the principles of the invention may be applied to the filling of various types of thermometer mechanisms other than those specifically shown and described herein.

The thermometer mechanism illustrated in Figure 1 comprises a Bourdon coil 1 connected at one end by means of a hollow capillary tubing 2 to a bulb 3 which is to be placed in or near the material the temperature of which is to be taken. A short piece of soft metal tubing 4, communicating with the end of the coil 1, acts as a filling tube through which the air may be evacuated and the temperature responsive fluid introduced into the coil 1 and bulb 3 in accordance with the principles of the invention.

The inner end of the Bourdon coil 1 is connected by means of a spring compensating coil 5 to an arbor 6 which is adapted to support a suitable pointer so that when the Bourdon coil is coiled or uncoiled by the expansion or contraction of the fluid in the thermometer mechanism it will turn the arbor 6 and move the pointer back and forth over a suitably calibrated scale (not shown) to indicate the temperature changes.

To facilitate and expedite the filling of the thermometer mechanisms with the temperature responsive fluid, I provide a plurality of hollow star shaped members 7, of brass or any other suitable material, each having a tubular stem 8 projecting from the center thereof which is adapted to be secured in fluid tight engagement with the manifold pipe 9 of the evacuating and filling apparatus 10, by means of the nipples 11.

The evacuating and filling apparatus comprises the manifold pipe 9, connected at one end to a vacuum pump 12 and at the other end to a pressure cylinder 13, adapted to contain a supply of the temperature responsive fluid suitable valves 14 and 14a being provided to control the communication between the pipe 9 and the pump 12 and cylinder 13. The vessel 15 which holds the main supply of the temperature responsive fluid, is preferably located at a higher level than the cylinder 13, so that the fluid will flow by gravity through the pipe 16 into the pressure cylinder 13 when the valve 16a is opened. A tap 17, controlled by the valve 17a, provides a means for relieving the pressure in the cylinder 13 and for indicating when the cylinder is filled with the fluid from the vessel 15.

A pressure means or pump 18 communicates through the pipe 19, with the top of the cylinder 13 and is provided with control valves 19a and 19b for controlling the admission of the pressure medium to the cylinder. A pressure gage 20 registers the pressure which prevails in the system.

In the use of the apparatus for filling the thermometer mechanisms of the type shown in Figure 1, the end of a filling tube 4, with the Bourdon coil 1 and bulb 3 attached, is soldered at 22 into the end of each point of the star-shaped member 7 as illustrated in Figure 6 and, after the assembly has been tested for leaks, a plurality of the members 7, with a thermometer mechanism attached to each pipe of the member are connected to the manifold pipe 9 by loosening the nuts 11a, inserting the ends of the tubes 8 through the nuts and through washers 11b and tightening the nuts against the compressible washers 11b to make a fluid tight connection. The vacuum pump 12 is then started to exhaust the air from all the thermometer mechanisms and when the vacuum gage 21 shows that the desired degree of vacuum prevails in the pipe 9, the valve 14 is closed.

The valve 14a is then opened and a temperature responsive fluid such as alcohol, xylene or the like, contained in the cylinder 13 is admitted to the manifold 9 and flows through the tube 8 and pipes 7 into each of the attached thermometer mechanisms. It will be understood, of course, that the substantially complete vacuum which prevails in the system, and the pressure upon the fluid in the cylinder, will insure a complete and uniform filling of each thermometer mechanism.

When the thermometer mechanisms have been filled with the temperature responsive fluid, the operator in turn grasps the soft metal filling tube 4 of each thermometer mechanism with a pair of pinchers or the like 23, and squeezes the walls of the tube together as indicated at 4b to prevent the temperature responsive fluid from escaping from the thermometer mechanisms. He then cuts the tube 4, by means of suitable shears 24 between the pinchers 23 and member 7, leaving the portion 4a hanging from the member 7. To prevent the escape of the temperature responsive fluid from the portion 4a, the shears or nippers 24 used to cut the filling tube 2 may be provided with compression lugs 24a to press the end of the portion 4a together and prevent leakage of the fluid remaining in the pipe 9 and member 7. After the tube 4 with the thermometer mechanism attached has been severed, the operator carries the mechanism with the sides of the tube 4 still compressed by the pinchers 23 to an oxyacetylene or other high temperature torch 25 and holds the end 4b of the tube in the flame until it is fused together to permanently seal the temperature responsive fluid in the thermometer mechanism.

This severing and sealing procedure is, of course, repeated as to each of the thermometer mechanisms until all have been removed from the star-shaped members 7.

A valve 14b is then opened to cause all of the liquid remaining in the manifold pipe 9 and tank 13 to be blown out of the system through a blow out pipe 14c into a jar or other container placed to receive it. This cleans the system out, preparatory to evacuating it for the next set of thermometers without muss or waste. The tubes 8 are next removed from the manifold 9 and the branches 7 of the star shaped members are held in a torch flame to melt out the solder so that the tube stubs 4a can be removed. Each stub 4a is removed by first heating its junction with the branch 7 to which it is attached, and then tapping the tube 8 rather sharply against a block.

It will be seen that I have provided an apparatus and process for filling a plurality of thermometer mechanisms under substantially identical conditions which will secure uniform evacuation and filling of each mechanism and produce a standardized finished product. However, it must be understood that the invention is not limited to the filling of a plurality of thermometer mechanisms but may also be used for the filling of only one thermometer mechanism at a time.

To prepare the members 7 for use in filling another set of thermometer mechanisms, the filling tubes 4 of the new set of thermometer mechanisms may be soldered in the points of the members 7, and the tubes 8 may be again joined to the manifold 9.

The number of thermometers to be filled at one operation may be widely varied. If high quantity production is demanded, more than one thermometer mechanism may be soldered to each tube 7. If orders are slack, however, as many of the nipples 11 may be plugged as desired, and any of the attached tubes 7 that are not needed may be sealed with solder.

In compliance with the patent statutes I have illustrated and described a preferred method and apparatus for practicing the invention, but it will be readily apparent to persons skilled in the art that various modifications and changes can be made therein without departing from the spirit of the invention or the scope of the appended claims.

What I claim is:—

1. The process of filling a thermometer mechanism including two chambers connected by a capillary tube with temperature responsive liquid which comprises first, substantially completely exhausting the air from the thermometer mechanism through an open end thereof at one operation, then conducting the temperature responsive liquid to the exhausted thermometer mechanism and forcing it through said open end into said mechanism under super-atmospheric pressure to fill the same at one operation, and finally sealing the thermometer mechanism with the liquid therein under super-atmospheric pressure.

2. The process of filling a thermometer mechanism including a Bourdon tube, a thermometer bulb, and a capillary tube connecting said Bourdon tube and bulb, with temperature responsive liquid which comprises first, substantially completely exhausting the air from the thermometer mechanism through an open end thereof at one operation, then conducting the temperature responsive fluid to the exhausted thermometer mechanism under pressure and forcing it through said open end into said mechanism to fill the same at one operation, and finally sealing the thermometer mechanism with the liquid therein under super-atmospheric pressure.

3. The process of filling hollow thermometer mechanisms each including a Bourdon tube, a thermometer bulb, and a capillary tube connecting said Bourdon tube and bulb, with temperature responsive liquid under pressure which comprises providing each thermometer mechanism with a filling tube which is deformable at the filling temperature, exhausting the air substantially completely from the thermometer mechanism through said tube, filling the exhausted thermometer mechanism with the temperature-responsive liquid under pressure through said tube, compressing the walls of the filling tube together to confine the liquid in the thermometer mechanism under super-atmospheric pressure, and severing the filling tube at a short distance outward from the compressed portion thereof.

4. The process of filling hollow thermometer mechanisms with temperature responsive liquid which comprises providing each thermometer mechanism with a filling tube which is deformable at the filling temperature, connecting the filling tubes with an air evacuating and fluid filling manifold, simultaneously exhausting the air substantially completely from the thermometer mechanisms through said tubes, simultaneously filling the exhausted thermometer mechanisms with the temperature responsive liquid under predetermined super-atmospheric pressure through said tubes, compressing the walls of each of the filling tubes together at a plurality of separated points to confine the liquid in the thermometer mechanisms under super-atmospheric pressure and prevent the release of manifold pressure and severing the filling tubes from the evacuating and filling apparatus between the compressed portions of the filling tubes and the manifold while at the same time closing the ends of the filling tubes left connected to the manifold.

5. The process of filling thermometer mechanisms with a temperature responsive liquid which comprises connecting a plurality of thermometer mechanisms to an evacuating and filling manifold, simultaneously exhausting all the thermometer mechanisms substantially completely, then simultaneously filling all the exhausted mechanisms with a temperature responsive liquid under super-atmospheric pressure, and maintaining the pressure on the liquid in the thermometer mechanisms while the thermometer mechanisms are separately severed from the exhausting and filling manifold and the temperature responsive fluid is sealed therein, to thereby secure uniformity of pressure in the filled thermometer mechanisms.

6. The process of filling thermometer mechanisms with temperature responsive liquid which comprises connecting a plurality of thermometer mechanisms to an air exhausting manifold, substantially completely exhausting said mechanisms of air simultaneously and thereafter filling the exhausted thermometer mechanisms simultaneously with temperature responsive liquid under super-atmospheric pressure, and sealing the mechanisms with the liquid therein under super-atmospheric pressure.

7. The process of filling thermometer mechanisms with temperature responsive liquid which comprises substantially completely exhausting the air from a large number of such mechanisms at one operation, thereafter conducting the filling liquid to said mechanisms and filling them at one operation under super-atmospheric pressure and sealing the mechanisms while maintaining the liquid therein under super-atmospheric pressure.

8. The process of filling thermometer mechanisms with temperature responsive liquid under super-atmospheric pressure which comprises providing each of the mechanisms with a filling tube of soft metal, securing said tube to an air exhausting and liquid filling manifold, exhausting and filling the thermometer mechanisms through their respective filling tubes and then separating the thermometer mechanisms successively from said manifold while confining the liquid in each mechanism under super-atmospheric pressure, by pinching each filling tube closed at two points and severing it between said points.

9. In an apparatus for filling capillary bore thermometer mechanisms, the combination with a manifold to which the thermometer mechanisms are connected, of means to substantially completely exhaust said manifold and the connected thermometer mechanisms, means to shut off the exhausting means from the manifold, means to thereafter supply liquid to the manifold for filling the thermometers, means to apply a predetermined uniform super-atmospheric pressure to the liquid and to maintain it as the mechanisms are separated from the manifold one by one, and means to remove excess liquid from the manifold after the thermometer mechanisms have been filled.

In testimony whereof I have affixed my signature to this specification.

HERMAN SCHLAICH.